United States Patent [19]

Smrt

[11] 4,333,264
[45] Jun. 8, 1982

[54] TREE NURSERY CLIP

[76] Inventor: Thomas J. Smrt, 172 S. Northwest Hwy., Cary, Ill. 60013

[21] Appl. No.: 871,829

[22] Filed: Jan. 24, 1978

[51] Int. Cl.³ .................. A01G 17/04; A01G 9/12
[52] U.S. Cl. ........................................ 47/42; 47/44; 47/47; 256/54; 24/243 R
[58] Field of Search .................... 47/42–47; 256/54; 24/73 PS, 81 B, 81 CC, 81 G, 81 LC, 81 TH

[56] References Cited

U.S. PATENT DOCUMENTS

| 730,779 | 6/1903 | Lacy | 47/47 |
|---|---|---|---|
| 2,016,732 | 10/1935 | Thompson | 47/47 |
| 2,851,823 | 9/1958 | Peterson | 47/47 |
| 2,968,850 | 1/1961 | Tinnerman | 24/81 G |
| 3,010,256 | 11/1961 | Ise | 47/42 |
| 3,531,090 | 9/1970 | Laible | 256/54 X |

FOREIGN PATENT DOCUMENTS

| 126626 | of 1926 | Australia | 47/47 |
|---|---|---|---|
| 70957 | 4/1950 | Denmark | 47/47 |
| 67577 | 3/1893 | Fed. Rep. of Germany | 47/42 |
| 313324 | 4/1956 | Switzerland | 47/47 |
| 17406 | of 1912 | United Kingdom | 47/44 |
| 320689 | 10/1929 | United Kingdom | 47/47 |
| 328438 | 5/1930 | United Kingdom | 47/47 |
| 928909 | 6/1963 | United Kingdom | 47/47 |

*Primary Examiner*—Steven A. Bratlie

[57] ABSTRACT

A tree nursery clip cooperates with a stake to hold a tree in a desired position. The clip has a pair of openings through which a stake is inserted and a pair of bendable arms. The shape of the openings and the cross section of the stake is non-circular so that a plurality of clips can be non-rotatably positioned along the stake. The tree is pulled alongside the stake, and the arms of each clip are bent around the tree to hold the tree adjacent the stake at a plurality of points along the length of the tree.

1 Claim, 9 Drawing Figures

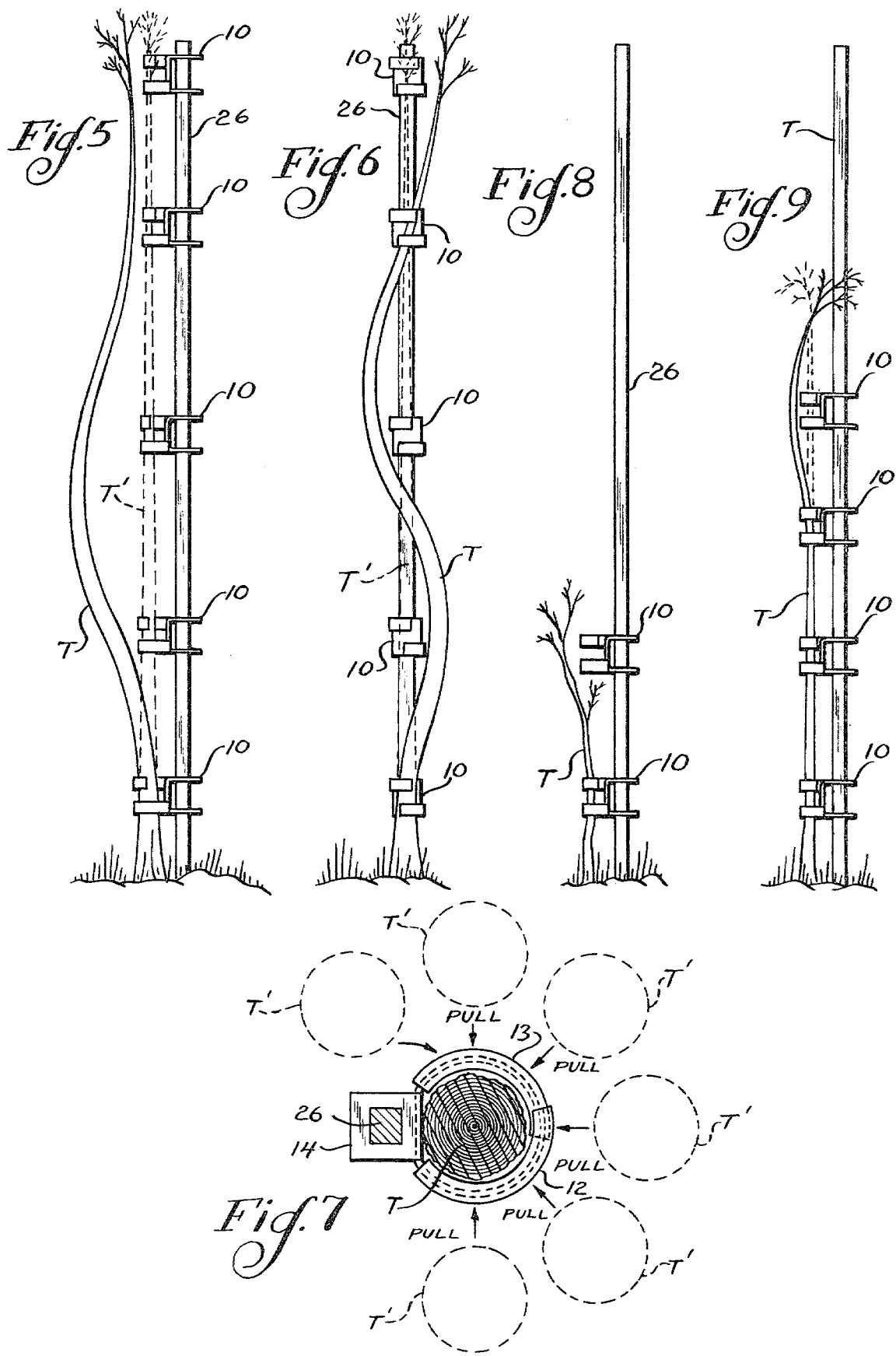

TREE NURSERY CLIP

BACKGROUND AND SUMMARY

This invention relates to a method and a clip for training trees to grow in a desired shape.

Young trees or saplings do not always grow straight, and many different types of posts, anchors, etc. have been used to train a tree to grow with a straight leader. However, disadvantages have been encountered with many of these training devices. For example, some devices may be difficult to position and secure around the tree, or, if the device is easy to position, it may not hold the tree securely.

The invention provides a clip which is inexpensive and easy to use yet one which securely holds the tree in the desired position. The clip has a pair of spaced-apart parallel attaching portions, each of which has a rectangular opening. The rectangular openings cooperate with a rectangular stake so that the clip is non-rotatably positioned on the stake. A pair of bendable arms on the clip can be bent around the tree to hold the tree adjacent the stake.

DESCRIPTION OF THE DRAWING

The invention will be explained in conjunction with an illustrative embodiment shown in the accompanying drawing, in which

FIG. 5 is a side elevational view of a tree in the process of being pulled into position along side the stake, the straightened tree being shown in phantom;

FIG. 6 is a front elevational view of the tree and stake of FIG. 5 showing the curvature of the tree in another plane;

FIG. 7 is a cross sectional view through the tree after it has been straightened showing the different directions in which the tree has been pulled at different points along its length the plane of such points being represented by dotted-line circles; and FIGS. 8 and 9 are views showing use of the clip to train a tree as it grows, more clips being added as the tree grows.

DESCRIPTION OF SPECIFIC EMBODIMENT

Figure 1:
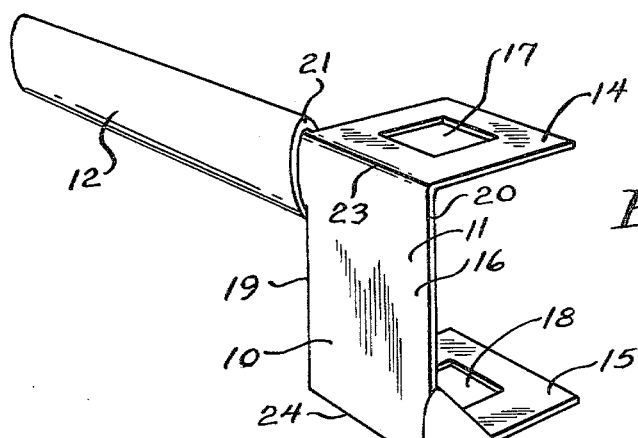
FIG. 1 is a perspective view of a tree clip formed in accordance with the invention.

Referring to FIGS. 1–4, the clip 10 includes a mounting portion 11 and a pair of arms 12 and 13. The mounting portion is generally C-shaped and includes top and bottom flat attaching portions 14 and 15 and a bight or connecting portion 16. The attaching portions are provided with rectangular openings 17 and 18. The arms extend in opposite directions from the side edges 19 and 20 of the bight portion, and the arms are spaced in a vertical direction so that they will not overlap when they are bent around the tree. Protective sleeves 21 and 22 of plastic or other suitable material cover the arms and protect the tree from damage by the arms.

The clip can be inexpensively stamped from sheet metal or the like, and the attaching portions can be bent at right angles to the bight portion along bend lines 23 and 24. I have used 18 gauge galvanized sheet metal, and this material has sufficient bendability to permit the arms to be easily bent around the tree yet sufficient strength to hold the tree.

Figure 2:
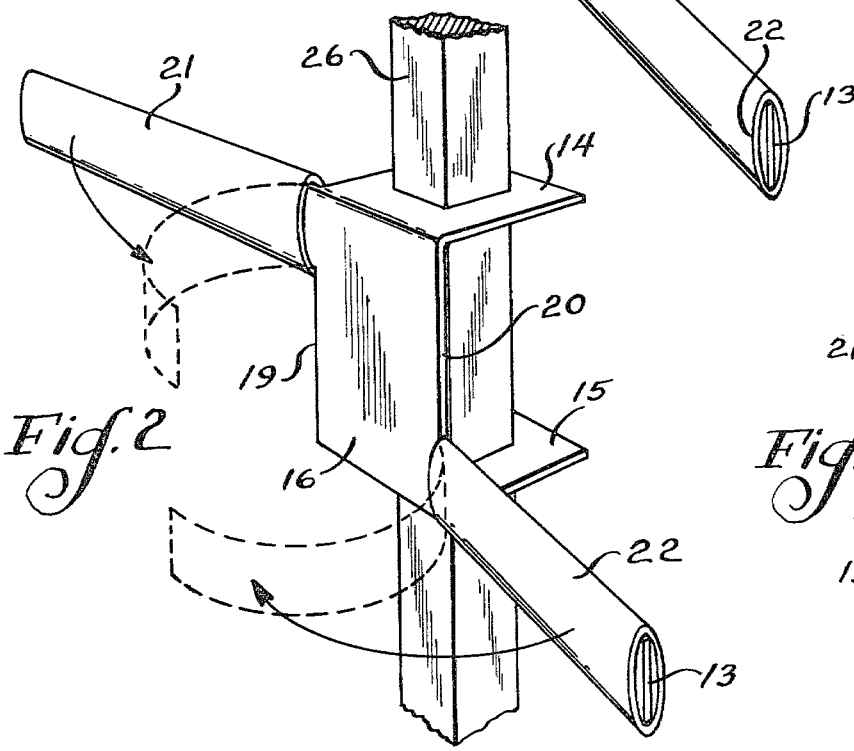
FIG. 2 is a perspective view of the clip positioned on a square stake.
Figure 3:
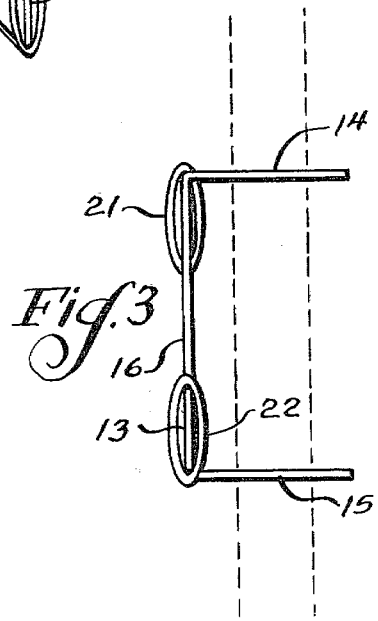
FIG. 3 is a side elevational view of the clip.
Figure 4:
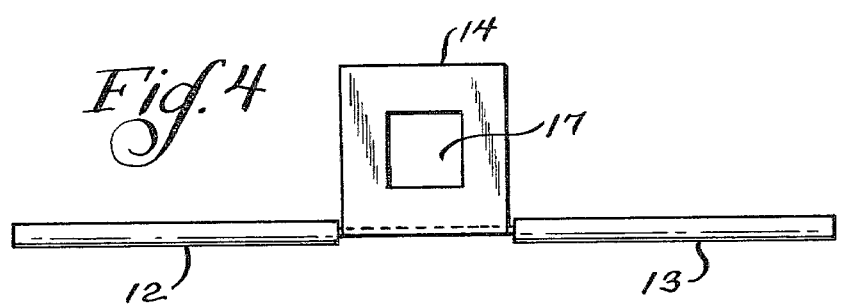
FIG. 4 is a top plan view of the clip.

FIG. 2 illustrates the clip mounted on a stake 26 which has a rectangular cross section corresponding to the size of the rectangular openings 17 and 18 in the clip. The clip can be moved freely up and down the stake when the attaching portions are perpendicular to the stake. However, when the clip is released by the user, the weight of the clip causes the attaching portions to become canted relative to the stake, and the clip will remain at a desired point along the stake until the arms are bent around the tree. FIG. 2 also illustrates the way in which the arms are bent to hold the tree against the bight portion 16.

The tree T shown in FIGS. 5 and 6 has a complex curved shape which is shown in two planes. The stake 26 is anchored in the ground near the base of the tree, and a plurality of clips 10 are positioned at spaced points along the stake. FIG. 7 illustrates in phantom the position of the tree indicated by the dotted-line circles T' relative to the stake at various horizontal planes along the length of the stake. At the level of each clip, the tree is pulled to a position against the bight portion, and the arms are bent around the tree to clamp the tree against the bight portion. The straightened tree is illustrated in phantom at T' in FIGS. 5 and 6. Since the clips cannot rotate on the stake, the tree can be pulled into a straight line corresponding to the stake. The plastic sleeves on the arms protect the tree from being bruised or chafed.

FIG. 8 shows a stake 26 along side a young sapling T in order to train the sapling as it grows. The length of the sapling in FIG. 8 is such that only a single clip 10 is needed. FIG. 9 illustrates the sapling after additional growth, and more clips are added to the stake and bent around the tree as it grows.

Although the preferred embodiment of my clip has rectangular openings for use with a rectangular stake, other non-circular shapes for preventing rotation of the clips on the stake can be used. For example, other polygons or even oval shapes can be used.

The arms can be bent and straightened many times so that the clips can be relocated at different points along the tree as the tree grows. This protects the bark from bruises or callouses and prevents the bark from growing over the clips. The clips can also be removed and used with another tree after one tree is trained.

Although I envision the primary use of the clips to train a tree to grow in a straight line parallel to the stake, the clips can also be used to train a tree to grow in a desired curved or bent configuration. In this case the clips can be mounted on a rectangular stake which has a shape corresponding to the shape which the tree should take.

While in the foregoing specification a detailed description of a specific embodiment of my invention was set forth for the purpose of illustration, it is to be understood that many of the details hereingiven may be varied considerably by those skilled in the art without departing from the spirit and scope of the invention.

I claim:

1. A tree nursery clip for training a tree to grow in a desired configuration comprising a generally C-shaped mounting portion having an upper planar attaching portion and a lower planar attaching portion connected by a generally planar bight portion, the attaching portions extending generally perpendicularly from the bight portion and being generally parallel to each other, each of the attaching portions having a non-circular opening for receiving a correspondingly shaped stake whereby the clip will not rotate relative to the stake, and a pair of bendable arms extending from the bight portion in generally opposite directions, the arms being constructed and arranged to be bent around a tree to hold the tree adjacent to the stake.

* * * * *